Patented Nov. 15, 1932

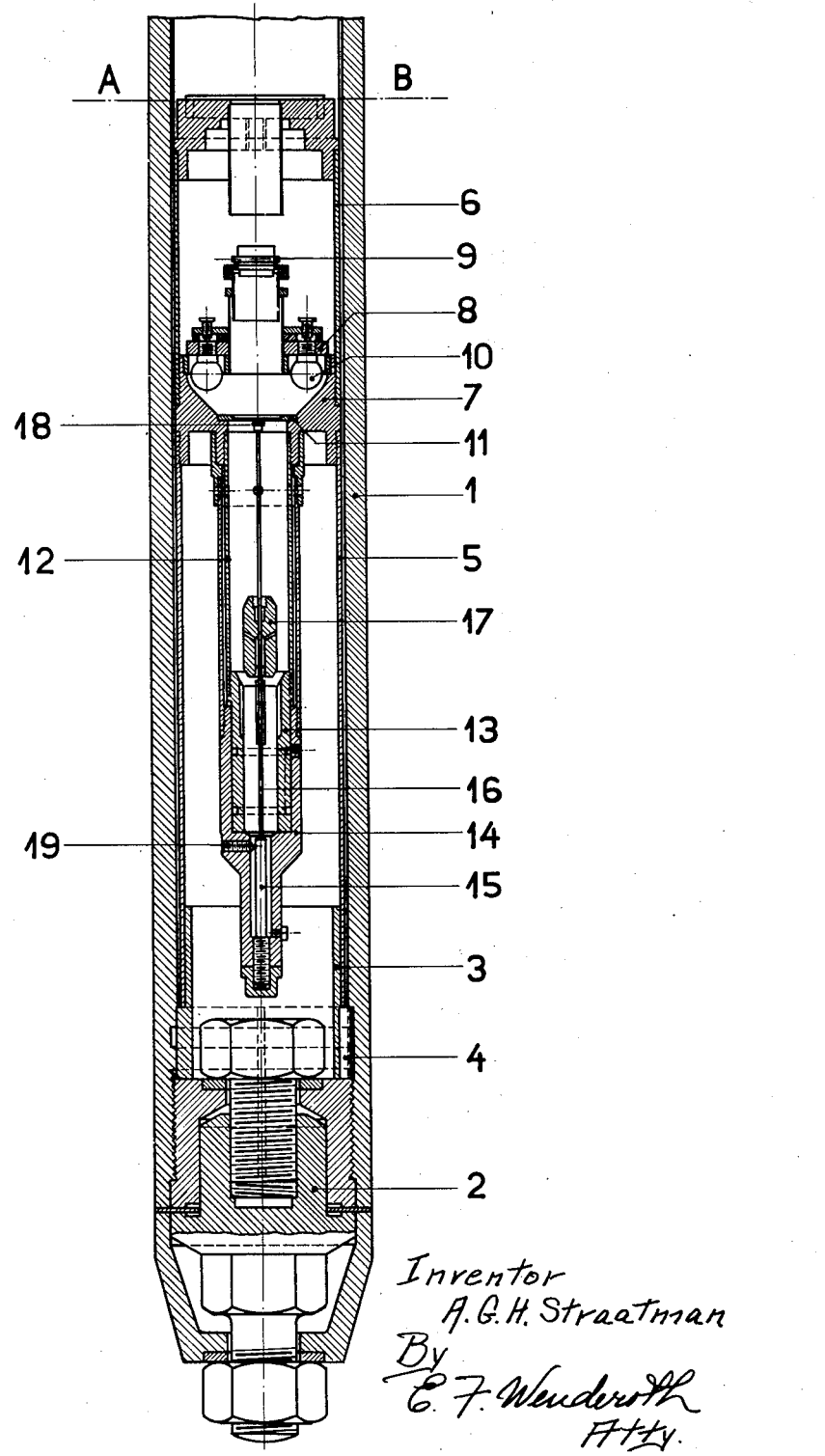

1,887,907

UNITED STATES PATENT OFFICE

ALPHONS GERARD HUBERT STRAATMAN, OF THE HAGUE, NETHERLANDS, ASSIGNOR TO NAAMLOOZE VENNOOTSCHAP DE BATAAFSCHE PETROLEUM MAATSCHAPPIJ

APPARATUS FOR SURVEYING WELLS

Application filed February 25, 1931, Serial No. 518,219, and in Germany February 27, 1930.

For the determination of the deviation of wells several instruments have been designed, which, however, have the disadvantage of a too small measuring-range. In these apparatuses the deviation of the well is determined with the aid of a pendulum or a box-level, the position of which is recorded by mechanical or photographic means.

Where the well has a large deviation from the vertical and a pendulum is used for the determination, the difficulty is that unless the apparatus is made with a large diameter, the pendulum has to be very short (as naturally it must be kept free from the side walls), which detracts from the accuracy of the instrument. It is then difficult to obtain a direct photographic registration of the position of the pendulum, because when the object-lens is finely adjusted for the zero position of the instrument, the picture obtained in other positions becomes indistinct, which does not tend towards an accurate reading. When using a box-level this drawback is even more pronounced, the picture then showing the air-bubble seen from aside.

It is an object of the invention to avoid the above-mentioned difficulties and to procure an apparatus with the aid of which the inclination of wells may be accurately determined, even when the angle of inclination is large.

The drawing represents the essential parts of an apparatus according to the invention in vertical section. These parts are enclosed in a jacket 1, which is closed at the bottom by the cap 2 and which may be orientated by means of the rods, on which the apparatus is run into the well. The measuring-device proper is held inside the jacket by ring 3, which owing to key 4 can only be inserted in the jacket in a definite position.

Between the two cylinders 5 and 6, which are rigidly connected to ring 3, is situated part 7. At the top this part is closed by ring 8 provided with a circle of small electric light bulbs (10) and a photographic lens 9; in the bottom end is situated a ring 11 with two diagonal threads, dividing the ring space into four equal parts.

Into the bottom of part 7 a tube 12 is screwed, ending in piece 13, which acts as a guiding means for a sleevelike part 14. In the bottom of the latter part is fixed a rod 15, which terminates in a thin, flexible rod 16, which at a certain level bears a weight 17. On the extension of rod 16 a small cap 18 is provided, which is situated close to the diagonal threads in ring 11.

When the electric bulbs are lighted, a picture of the top surface of the cap and the diagonal threads is made in the plane A B, in which the recording films move. The apparatus for moving the film, which apparatus may be of any known and conventional structure, is situated in the upper part of the jacket not shown in the drawing.

By means of three adjusting screws 19, only one of which is shown in the drawing, the instrument is adjusted in such a way that when it is standing in the vertical position the center-point of a circle marked on the cap is in alignment with the intersection of the diagonal threads.

In order to damp the swinging of rod 16 the space inside part 14 up to the weight 17 is filled with oil. It is obvious that the damping-means may be of varying design. In order to avoid inaccuracies resulting from the fact that the dilatation by heat is not the same for oil and metal, it is, for instance, preferable to position the weight 17 above the liquid level and to provide for a special damping means, consisting in a hollow cylindrical shell connected to rod 16 and immersed in the oil.

When sleeve 14 is pushed downward, the weight enters the opening of 13, thereby locking the apparatus.

The working of the apparatus is as follows:

When the apparatus is moved out of its vertical position, due to an inclination of the well, in which it is let down, the force of gravity acts upon the weight 17, causing the thin rod to bend according to the inclination of the apparatus and the thickness of the rod, said bend being made in the plane of inclination, i. e. the vertical plane in which the axis of the well is situated. The center-point of the circle on the cap 18 is now out of alignment with the intersection of the diagonal threads. By lighting the lamps 10 a photographic picture is made on the film, said picture showing the diagonal threads as well as the circle and centerpoint of the cap. From the position of this mark relative to the threads the inclination of the well may be derived, if the relation between the inclination and the bend of the rod has previously been empirically determined. The latter may be done by means of a special gauging device.

The images on the film are read through a microscope. Seeing that in practice the cap 18 moves over a spherical surface with the length of the rod as radius, the cap 18 may be considered to move in a flat plane over the surface concerned, so that for all angles of inclination of the well a sharply-outlined image is obtained both of the cap and of the diagonal threads. Thus a rather strong microscope may be used and accurate readings can be made.

The direction of deviation of a well in respect to a fixed direction of the instrument is also determined with the aid of the microscope by determining the angle formed by the lines joining the intersection of the diagonal threads and the recorded center-point and a fixed point on the edge of the ring holding the diagonal threads. The orientation of the said fixed point may be obtained in known manner by means of the drill rods on which the apparatus is run into the well.

What I claim is:

1. An apparatus for determining the inclination of wells comprising a cylindrical jacket, a flexible rod normally extending longitudinally within said jacket, one end of the rod being clamped in fixed position relative to said jacket and the other end being free to move, a weight associated with said rod and being of sufficient mass to bend the rod when the jacket is in an inclined position, and means for recording the position of the rod relative to the jacket.

2. An apparatus according to claim 1, in which the rod is provided with indicating means and an optical recording device is adapted to register the position of said indicating means relative to a fixed structure associated with the jacket.

3. An apparatus according to claim 1, in which means are provided for damping the oscillations of the rod.

4. An apparatus according to claim 1, in which the rod and weight are situated within a space adapted to contain a liquid for damping oscillations of the rod.

5. An apparatus according to claim 1, in which means are provided for adjusting the position of the clamped end of the rod relative to the part of the jacket in which it is clamped, in order to enable the adjustment of the normal position of the rod and weight relative to the jacket.

In testimony whereof I have affixed my signature.

ALPHONS GERARD HUBERT STRAATMAN.